United States Patent [19]
Jang

[11] Patent Number: 5,337,625
[45] Date of Patent: Aug. 16, 1994

[54] SHIFT VALVE OF A HYDRAULIC CONTROL SYSTEM FOR AUTOMATIC TRANSMISSION

[75] Inventor: Jaedeog Jang, Seoul, Rep. of Korea

[73] Assignee: Hyundai Motor Company, Seoul, Rep. of Korea

[21] Appl. No.: 989,523

[22] Filed: Dec. 11, 1992

[30] Foreign Application Priority Data

Dec. 30, 1991 [KR] Rep. of Korea ............ 91-25202

[51] Int. Cl.$^5$ .................. B60K 20/00; F16H 61/12
[52] U.S. Cl. ......................... 74/335; 477/169; 477/906; 477/142
[58] Field of Search .......... 74/866, 867, 868, 869, 74/335

[56] References Cited

U.S. PATENT DOCUMENTS

| | | | |
|---|---|---|---|
| 3,937,108 | 2/1976 | Will | 74/866 |
| 4,351,206 | 9/1982 | Lemieux et al. | 74/866 |
| 4,391,166 | 7/1983 | Kubo et al. | |
| 4,494,423 | 1/1985 | McCarthy et al. | 74/869 |
| 4,628,772 | 12/1986 | Nishikawa et al. | 74/866 |
| 4,815,341 | 3/1989 | Ohkubo et al. | 74/869 X |
| 4,841,816 | 6/1989 | Bullock | 74/866 |
| 4,896,568 | 1/1990 | Gierer | 74/867 X |
| 4,995,285 | 2/1991 | Hayakawa et al. | 74/869 |
| 5,193,417 | 3/1993 | Niiyama et al. | 74/866 |
| 5,199,313 | 4/1993 | Müller | 74/335 |

Primary Examiner—Richard M. Lorence
Attorney, Agent, or Firm—Birch, Stewart, Kolasch & Birch

[57] ABSTRACT

A shift valve of a hydraulic control system for an automatic transmission system, which ensures safety by maintaining a standard shifting operation when an electronic control system is out of order. A combination of the valve includes a housing, a shift lever of a manual valve, a valve spool of the shift control valve which is movably disposed in the housing against the shift lever, a plurality of ports formed on the housing at a side of the shift lever for supplying or being supplied with hydraulic pressure according to a shifting position, three ports formed on the housing at one side of the valve spool, and another port formed on the housing at the other side of the valve spool the valve spool being moved by the detected pressure to selectively close or open the ports, thereby enabling the automatic transmission at a "D" range, and being moved by being pushed by the shift lever which is manually shifted form a "D" position to a "1" position when the transmission control unit TCU is out of order, so that the ports are selectively closed or opened thereby enabling a manual transmission.

7 Claims, 4 Drawing Sheets

FIG.3
| SPEED STAGE / PORT NO | 1 | 2 | 3 | 4 |
|---|---|---|---|---|
| 29 | X | O | O | O |
| 28 | X | X | O | O |
| 27 | X | X | X | O |
O : OPEN
X : CLOSED
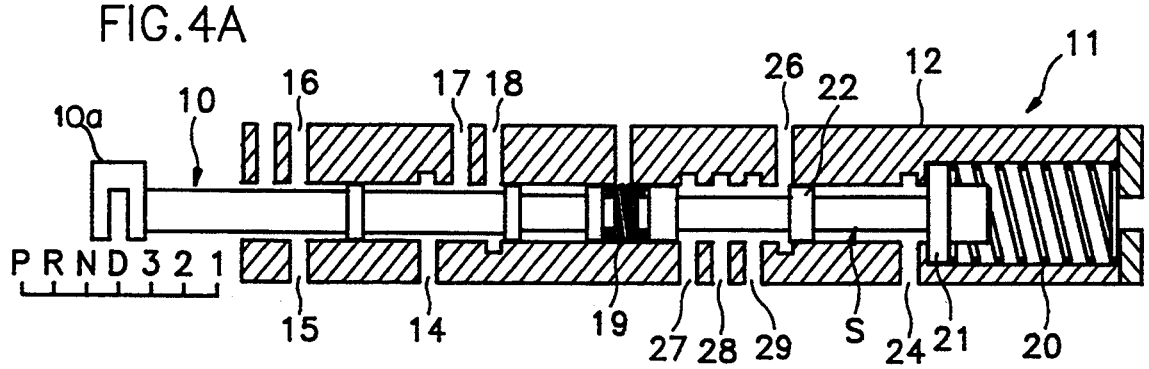
FIG.4A
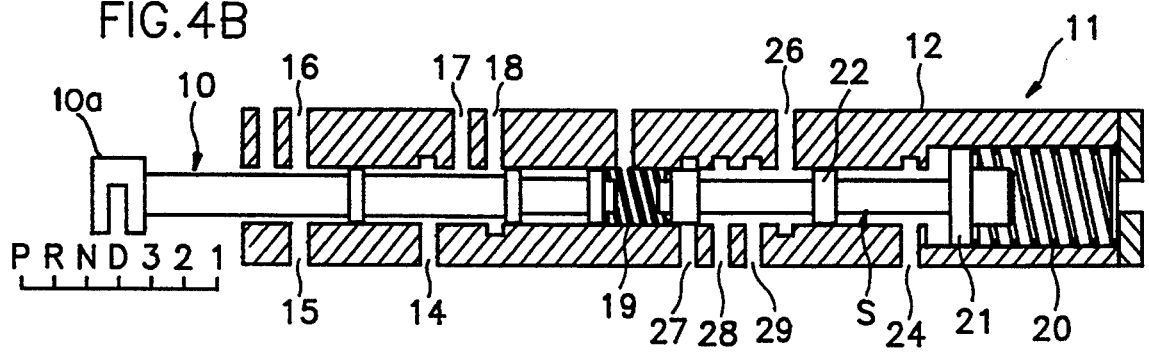
FIG.4B
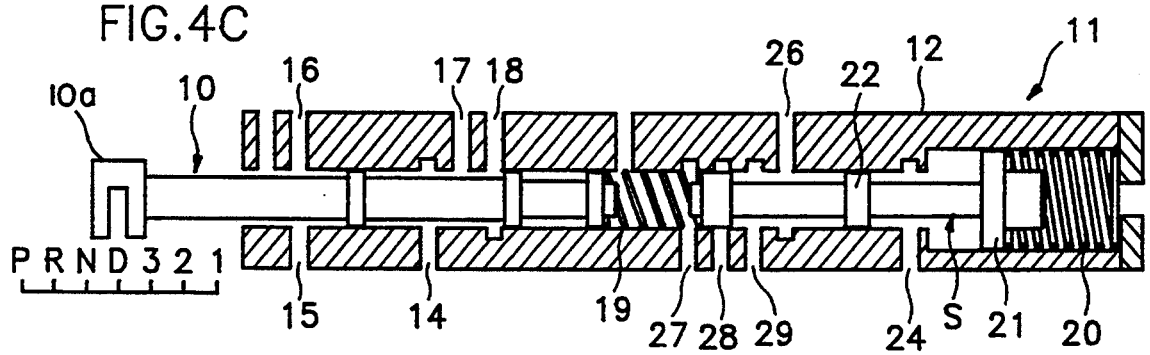
FIG.4C
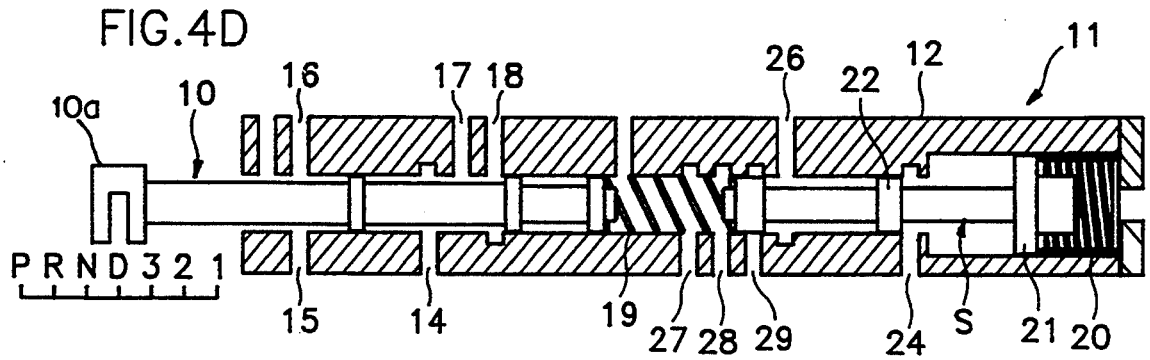
FIG.4D

SHIFT VALVE OF A HYDRAULIC CONTROL SYSTEM FOR AUTOMATIC TRANSMISSION

BACKGROUND OF THE INVENTION

1. Field of the Invention

The present invention relates to a shift valve of a hydraulic control system for an automatic transmission of a vehicle, and more particularly to the shift valve with a simple construction, which ensures safety by maintaining a formal shifting operation when an electronic control system is out of order.

2. Description of the Related Art

A conventional automatic transmission for a vehicle has a torque converter and a multiple stage transmission gear mechanism connected with the torque converter, which includes a hydraulically actuated friction member for selecting one of a plurality of gear stages of the transmission gear mechanism in accordance with vehicle operating conditions.

A hydraulic control system pressurized by a fluid pump provides working pressure required to operate the friction members and control valves.

The commonly used automatic transmission for a vehicle has the torque converter which generally includes a pump impeller connected with an engine output shaft to be driven thereby, a turbine runner with an output shaft member, and a stator disposed between the pump impeller and the turbine runner, so that hydraulic fluid is circulated by the engine-driven pump impeller through the turbine runner with the aid of the stator which functions to deflect the hydraulic fluid from the turbine runner to a direction where fluid flow does not disturb a rotation of the pump impeller when fluid flows into the pump impeller.

An automatic shift is made by an operation of the friction members such as clutches or a kick-down brake at each shift change. Also, a manual valve, a port of which is converted by selecting a position of a selector lever, is designed to be supplied with fluid from a fluid pump and to supply the fluid to a shift control valve. In a 4-speed automatic transmission, the shift control valve has an opening port changed by an electronic control system.

FIG. 5 is a sectional side view for depicting an operation state of a conventional shift control valve and manual valve, where two solenoid valves 1 and 2 operated according to a signal of a transmission control unit TCU, are connected with a manual valve 3, via a line 4 and a shift valve 5, and is designed to regulate line pressure.

Hydraulic pressure flowing into the shift control valve 5 through the line 4 is designed to work on a first land 6 and a second land 7 of a valve spool S, and two plugs 8 and 9 are disposed at both sides of the valve spool S to selectively change the line pressure according to the operation of the solenoid valves 1 and 2.

With respect to the above explained shift control valve 5, in a first speed stage, since both solenoid valves 1 and 2 are turned ON by the TCU, the line pressure supplied from the manual valve 3 is exhausted to exhaust ports EX via the shift control valve 5 and line 4.

Accordingly, the hydraulic pressure does not work on ports 5a and 5b of the shift control valve 5, and the line pressure from the manual valve 3 works on the first and the second lands 6 and 7, at this point, since a section area of the first land 6 is larger than that of the second land 7, the valve spool S is moved to the left and maintains the state of pushing the plug 8.

By the above described operation, the hydraulic pressure from a port 3a flows into a rear clutch (not shown) via a line C, and operates the rear clutch thereby realizing the first speed stage.

In a second speed stage, since only the solenoid valve 2 is turned ON by the TCU, the hydraulic pressure working on the port 5b is exhausted, the solenoid pressure works on the plug 8 and 9 via the port 5a thereby pushing the plug 8 rightward. The plug 8 is stopped by a stopper 8a.

At this point, since the plug 8 pushes the valve spool S rightward, the position of the land 7 is changed so that the line 4 and a port 5c communicate with each other, and the hydraulic pressure works on first-second speed shift valve (not shown) and an end clutch (not shown) thereby realizing the second speed stage.

In a third speed stage, since both of the two solenoid valves 1 and 2 are turned "OFF" by the TCU, the hydraulic pressure works on the ports 5a and 5b, and moves the valve spool S to a location of a stopper 9a.

According to such an operation, since the land 7 is designed to be located on the right side of a port 5d, the hydraulic pressure from the line 4 works on second-third/fourth-third speed shift valves (not shown) and the end clutch (not shown) whereby the third speed stage is realized.

Further, in a fourth speed stage, since only the solenoid valve 1 is turned ON by the TCU, the solenoid pressure working on the port 5a is exhausted, and in the case where the solenoid pressure working on the port 5b is higher than an elastic force of a spring which elastically supports the plug 9, the solenoid pressure moves the valve spool S and plug 9 to the right, locating the land 7 on the right side of a port 5e, so that the hydraulic pressure from the line 4 is supplied to the rear clutch (not shown) via the port 5e to achieve the fourth speed stage.

The above described conventional shift valve has some disadvantages that complicate construction of the electronic control due to using two solenoid valves which are respectively controlled by the electronic control system.

Additionally, in the case where the electronic control system is out of order, the solenoid valves 1 and 2 do not operate, so that the hydraulic pressure works on the ports 5a and 5b. Accordingly, a driver always has to drive a vehicle at the third speed stage.

As described above, if the vehicle is driven only at the third speed stage without the first and the second speed stages, an engine brake effect cannot be obtained in the vehicle, so that a safety problem occurs.

Further, U.S. Pat. No. 4,391,166 discloses a control system wherein a valve prevents up-shifting from a low speed stage when the electronic control system is out of order and transmission is set in a first speed stage.

SUMMARY OF THE INVENTION

It is an object of the present invention to provide a shift valve of a hydraulic control system for an automatic transmission system by unifying a shift control valve and a manual valve to eliminate the above-described problems of the conventional vehicle automatic transmission, wherein the valve is structurally simplified by unifying the shift control valve and the manual valve, and ensuring safety by maintaining a formal shifting operation when an electronic control system is out of order. A combination of the valve includes a housing, a shift lever of the manual valve which is manually shifted for each range and is disposed in the housing, a valve spool of the shift control valve which is movably disposed in the housing against the shift lever, a plurality of ports formed on the housing at a side of the shift lever for supplying or being supplied with hydraulic pressure according to each range, three ports formed on the housing at one side of the valve spool, which are selectively opened and closed by moving the valve spool, and another port formed on the housing at the other side of the valve spool for being supplied with a detected pressure from a linear solenoid valve operated according to a signal of a transmission control unit TCU, the valve spool being moved by the detected pressure at the formal operation to selectively close or open the ports, thereby realizing the automatic transmission at a "D" range, and being moved by being pushed by the shift lever which is manually shifted from a "D" position to a "1" position when the transmission control unit TCU is out of order, so that the ports are selectively closed or opened thereby realizing a manual transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a table showing closing and opening states of ports when a shift valve according to the present invention is operated;

FIGS. 4A to 4D are side sectional views showing shift valves of each speed stage at a "D" range according to the present invention.

DETAILED DESCRIPTION OF THE PREFERRED EMBODIMENT

Figure 1:
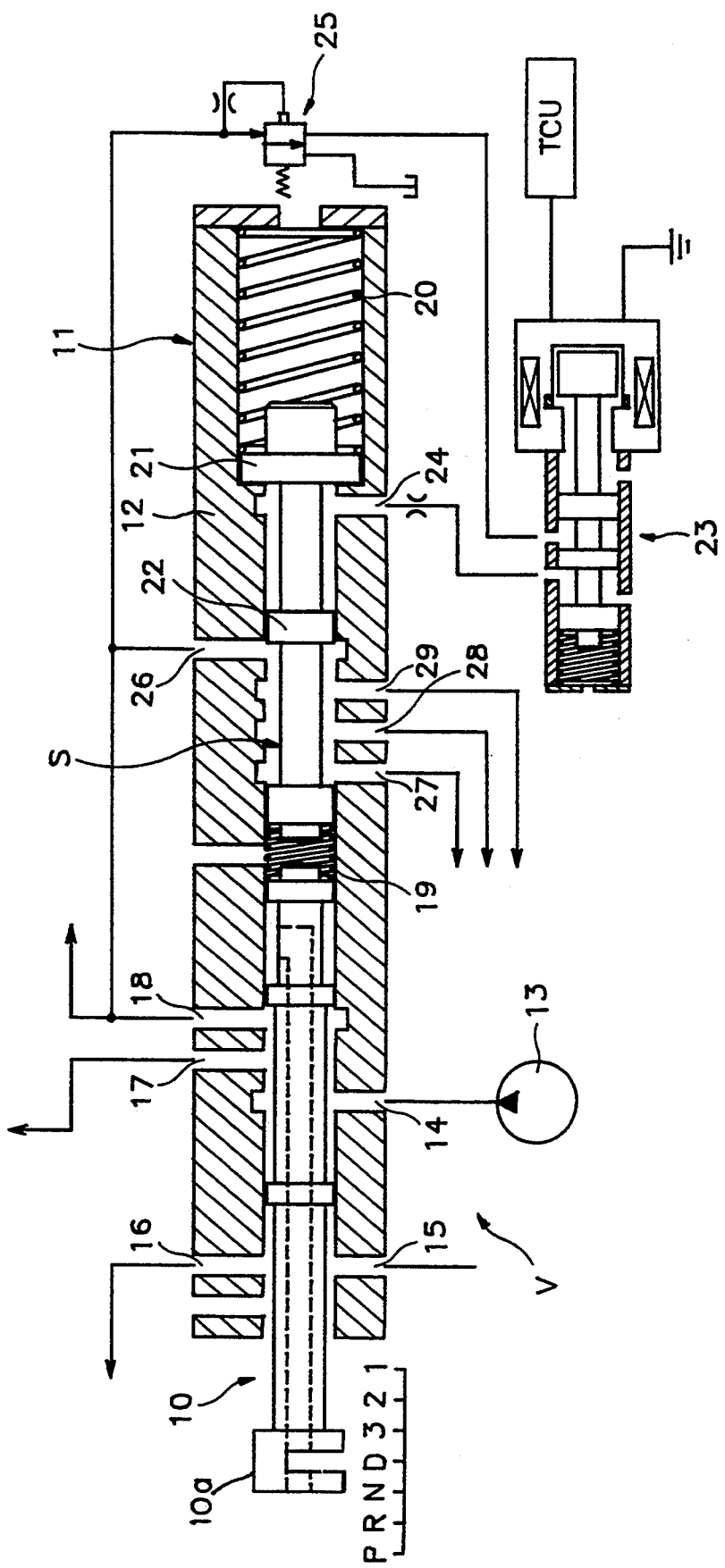
FIG. 1 is a side sectional view showing a shift valve according to the present invention.

FIG. 1 is a side sectional view showing a shift valve V according to the present invention, where the shift valve V is a shift control valve 11 formed by unifying a manual valve 10 and the shift control valve 11 on the same longitudinal axis.

The manual valve 10 and the shift control valve 11 composing the shift manual valve V are disposed in a housing 12 against each other, and the housing 12, where the manual valve 10 is located, has a first port 14 supplied with hydraulic pressure generated from a fluid pump 13, a second port 15 connected to an N-D control valve, a third port 16 connected with a rear clutch exhaust valve and a regulator valve, a fourth port 17 connected to the N-D control valve and the regulator valve, and a fifth port 18 connected with a pressure control valve.

The manual valve 10 is elastically supported by a spring 19 against the shift control valve 11, and another spring 20 having a higher modulus of elasticity than that of the spring 19 is disposed at a right end side of the shift control valve 11.

The spring 20 is elastically supported against a large land 21 of a valve spool S, and a sixth port 24 connected with a solenoid valve 23 is formed between the large land 21 and a small land 22.

A linear solenoid valve 23 is connected with a relief valve 25 for a stable supply of pressure, and is designed to operate by an electric signal of a transmission control unit TCU. The relief valve 25 is connected to the fifth port 18 and a seventh port 26.

Additional eighth, ninth and tenth ports 27, 28 and 29 are formed on a left side of the small land 22, the ports being connected with the rear clutch, exhaust valve and an end clutch valve, second-third and fourth-third speed shift valves at the end clutch valve, and a pressure regulating valve and a first-second speed shift valve.

Figure 2:
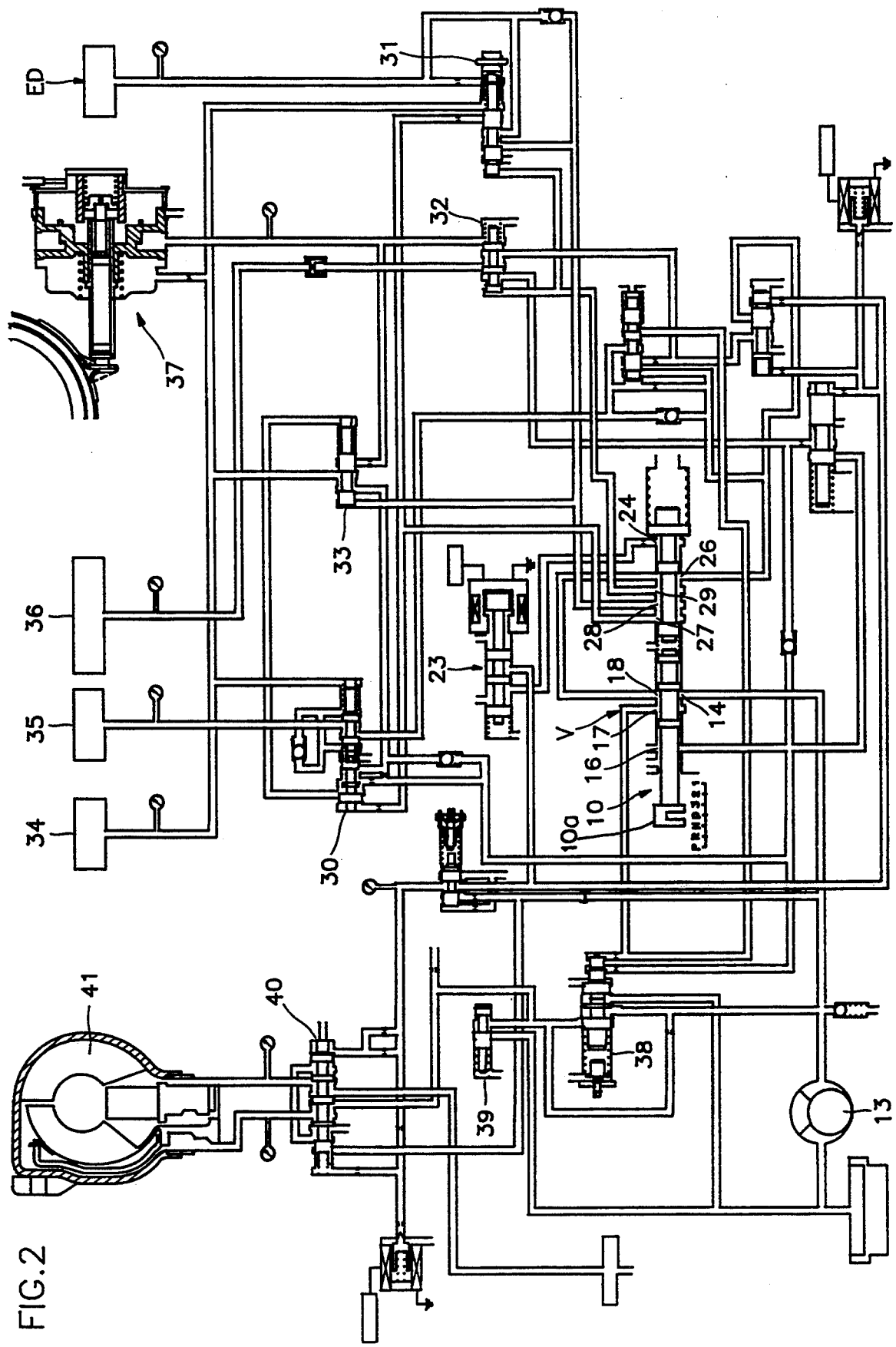
FIG. 2 is a schematic diagram of a hydraulic circuit showing that a shift valve of the present invention is equipped.
Figure 5:
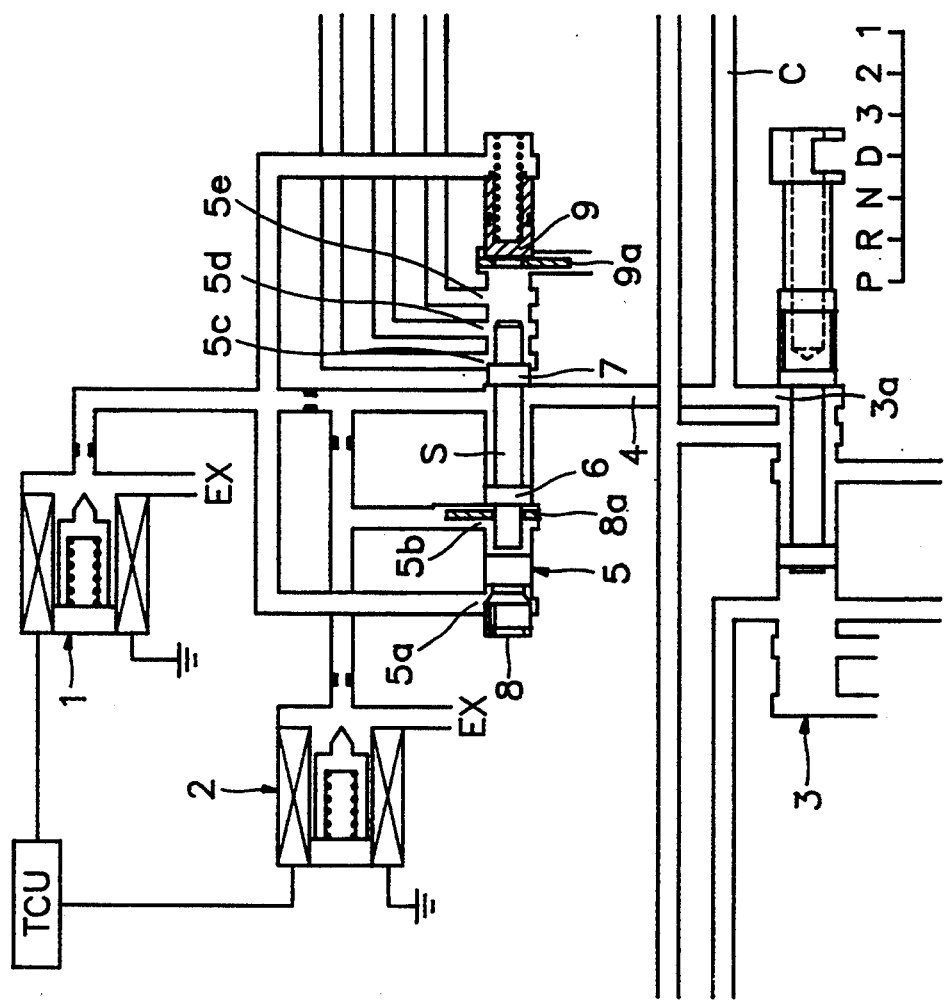
FIG. 5 is a side sectional view showing the conventional shift valve system of a 4-automatic transmission system.

In the shift valve of a hydraulic control system of the kind set forth, as shown in FIG. 2, the first port 14 is connected with the fluid pump 13 to be supplied with the hydraulic pressure, and the manual valve 10 and the shift control valve 11 in the housing 12 can move rightward or leftward according to the formation of the hydraulic pressure.

The eighth port 27 is connected with a rear clutch exhaust valve 30 and an end clutch valve 31, and the ninth port 28 is connected with a second-third/fourth-third speed shift valves 33 and the end clutch valve 31. Further, the tenth port 29 is connected with the pressure regulating valve and the first-second speed shift valve via the N-D control valve.

The valves are respectively connected with a front clutch 34, a rear clutch 35, a low-reverse brake 36, a kick down servo 37 and an end clutch ED, and are designed to operate them.

Further, the fluid pump 13 is designed to supply the hydraulic pressure to a torque converter 41 via a regulator valve 38, a torque converter control valve 39 and a damper clutch control valve 40.

A hydraulic circuit diagram described above is selected as one embodiment of the various hydraulic circuit diagrams. Accordingly, the shift valve according to the present invention can be used for all of the hydraulic control system for a 4-automatic transmission.

The shift valve of the present invention is operated by detecting pressure generated from the linear solenoid valve 23 operated in accordance with the electric signal of the TCU.

FIG. 3 is a table showing an opening and closing state of ports according to each of a plurality of speed stages, and FIGS. 4A to 4D are side sectional views showing a closing and opening state of ports according to each speed stage at a "D" range.

As shown in FIG. 4A, in a fourth speed stage, when the detected-pressure which flows into the port 24 becomes the lowest pressure, the shift control valve 11 moves leftward by elastic force of the spring 20, thereby opening the ports 27, 28 and 29.

In a third speed stage, the detected-pressure which flows into the port 24 becomes slightly higher than that of the fourth speed stage, thus, the pressure working on the large land 21 increases, so that the spring is compressed to move the valve spool rightward thereby closing the port 27 as shown in FIG. 4B.

In a second speed stage, the detected-pressure flowing into the port 24 becomes higher than that of the third speed stage, thus, the valve spool moves more rightward than a status of the third speed stage by compressing the spring 20, because the higher pressure than that of the third speed stage works on the large land 21.

By the above operation, the ports 27, 28 are closed and the second speed stage is realized as shown in FIG. 4C.

Further, as shown in FIG. 4D, in a first speed stage, the detected-pressure which flows into the port 24 becomes the highest pressure, thereby moving the valve spool fully rightward. Accordingly, the ports 27, 28 and 29 are closed and the first speed stage is accomplished.

The above described shift operation is achieved by the electric signal of the transmission control unit TCU. However, in the case where the detected-pressure can not be varied, that is, an electronic control unit is out of order, since the linear solenoid valve does not operate, the ports 27, 28 and 29 are always in the open state thereby maintaining up the fourth speed stage.

At this state, when a driver manually shifts a shift lever 10a to a position "3", the manual valve 10 moves rightward and pushes the valve spool V of the shift control valve 11 rightward via the spring 19 thereby closing the port 27 and realizing the third speed stage.

When the shift lever 10a is manually shifted to a position "2", manual valve 10 pushes the valve spool V of the shift control valve 11 rightward to close the ports 27, 28, thereby achieving the second speed stage.

Further, when the shift lever 10a is manually shifted to a position "1", the manual valve 10 pushes the valve spool V of the shift control valve 11 rightward to close the ports 27, 28 and 29 thereby realizing the first speed stage.

When the ports 27, 28 and 29 are closed, the ports are not in communication with the port 26.

To accomplish the above operation, the spaces of a D-3-2-1 have to be same as those of the ports 27, 28 and 29.

The shift valve of the present invention as explained above has a simple construction by unifying the manual valve and the shift control valve and using only one solenoid valve. And also, when the electronic control system is out of order, since the driver can manually shift the speed stage, safety is ensured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift valve of a hydraulic control system for an automatic transmission system, said shift valve comprising:
   a shift control valve;
   a manual valve linearly arranged with said shift control valve;
   a housing substantially surrounding said shift control valve and said manual valve;
   a shift lever connected to an end of said manual valve and exterior to said housing;
   a valve spool provided in connection with said shift control valve, said valve spool being movably disposed in the housing against said shift lever;
   a plurality of ports formed within said housing at a manual valve side thereof for supplying or being supplied with a hydraulic pressure in response to a range of movement of said shift lever;
   three ports formed within said housing at a valve spool side thereof to e selectively opened and closed by movement of said valve spool; and
   a single port formed within said housing at the valve spool side thereof;
   a linear solenoid valve for supplying a detected-pressure to said single port;
   a transmission control unit TCU for sending a signal to said linear solenoid valve, said signal corresponding to the detected pressure;
   a first spring elastically disposed between said manual valve and said valve spool; and
   a second spring elastically disposed between said valve spool and an inner end of said housing and having a larger modulus of elasticity than that of said first spring;
   said valve spool being moved by the detected-pressure through said single port to selectively close or open said three ports, thereby enabling an automatic transmission at a "D" range, and being moved by being pushed by the shift lever which is manually shifted from a "D" position to a "1" position when said transmission control unit TCU is out of order, such that said plurality of ports are selectively closed or opened thereby enabling a manual transmission.

2. The shift valve according to claim 1, wherein said valve spool of the shift control valve includes two lands against which the detected-pressure through said single port works.

3. The shift valve according to claim 2, wherein one land of said lands has a larger area than that of another land.

4. A hydraulic control system for an automatic transmission, said system comprising:
   a plurality of valves which control a plurality of clutches and a brake member in connection with forward and reverse speeds of the automatic transmission;
   a fluid pump for generating hydraulic pressure to said plurality of valves;
   a torque converter operable in connection with said fluid pump for selectively supplying rotating power to each gear element;
   a shift valve formed by linearly unifying a shift control valve and a manual valve, said shift valve being connected with said fluid pump for supplying the hydraulic pressure to each of aid plurality of clutches and valves according to one of a plurality of speed stages within a selected range of said automatic transmission;
   a transmission control unit generating an electric signal to said shift valve in accordance with each of said plurality of speed stages;
   a linear solenoid valve generating a detected-pressure according to the electric signal of said transmission control unit and supplying the detected-pressure to said shift valve; and
   a relief valve connected with an inlet side of said linear solenoid valve to maintain a stable pressure supply to said shift valve.

5. The hydraulic control system according to claim 4, wherein said shift valve includes
- a housing having a first port supplied with the hydraulic pressure from said fluid pump,
- a port connected with a rear clutch exhaust valve and a regulator valve, a port connected with said rear clutch exhaust valve and an end clutch valve,
- a port connected with a second-third/fourth-third speed shift valve and the end clutch valve, a port connected with the rear clutch exhaust valve and a first-second speed shift valve via an N-D control valve, and
- a shift member of a manual valve and a valve spool of a shift control valve disposed on the same longitudinal axis with respect to each other, said valve spool of the shift control valve being moved according to a position of the shift member for manual transmission in a case were an electronic control system is out of order.

6. The hydraulic control system according to claim 5, wherein the valve spool of the shift control valve includes two lands against which the detected pressure works.

7. The hydraulic control system according to claim 6, wherein one of the two lands has a larger section area than that of the another land.

* * * * *

UNITED STATES PATENT AND TRADEMARK OFFICE
CERTIFICATE OF CORRECTION

PATENT NO. : 5,337,625
DATED : August 16, 1994
INVENTOR(S) : Jaeduk Jang

It is certified that error appears in the above-indentified patent and that said Letters Patent is hereby corrected as shown below:

On the Title Page, under the item "[75] Inventor:"

change the name of the inventor, "Jaedeog Jang" to

-- Jaeduk Jang --

Signed and Sealed this

Fifteenth Day of October, 1996

Attest:

BRUCE LEHMAN

*Attesting Officer*     *Commissioner of Patents and Trademarks*